Nov. 3, 1953　　　　　A. SPRUNG　　　　　2,657,487
ROUTE MAP VIEWER
Filed March 16, 1949　　　　　　　　　　2 Sheets-Sheet 1
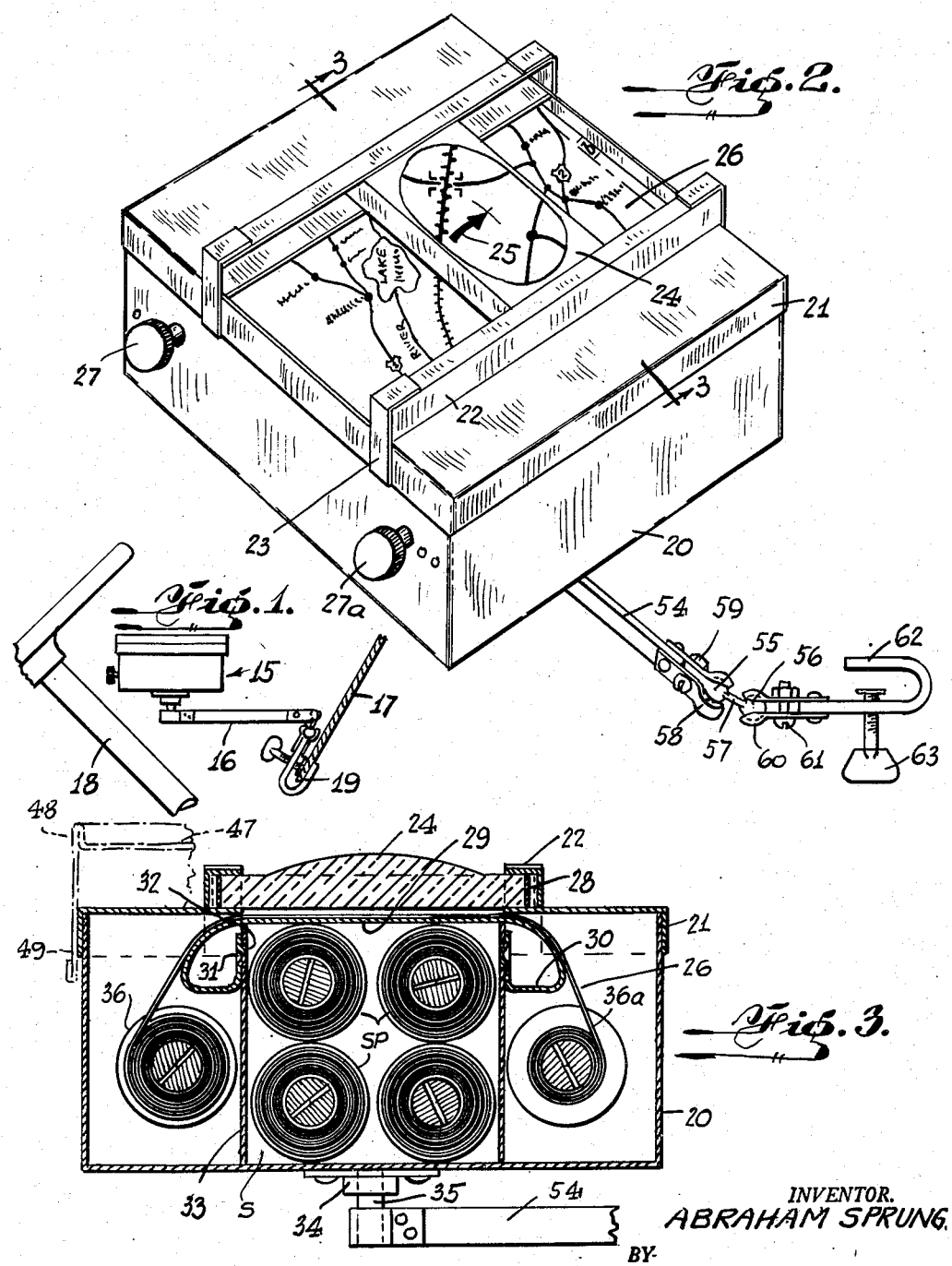
INVENTOR.
ABRAHAM SPRUNG,
BY
ATTORNEY.

Nov. 3, 1953
A. SPRUNG
2,657,487
ROUTE MAP VIEWER
Filed March 16, 1949
2 Sheets-Sheet 2
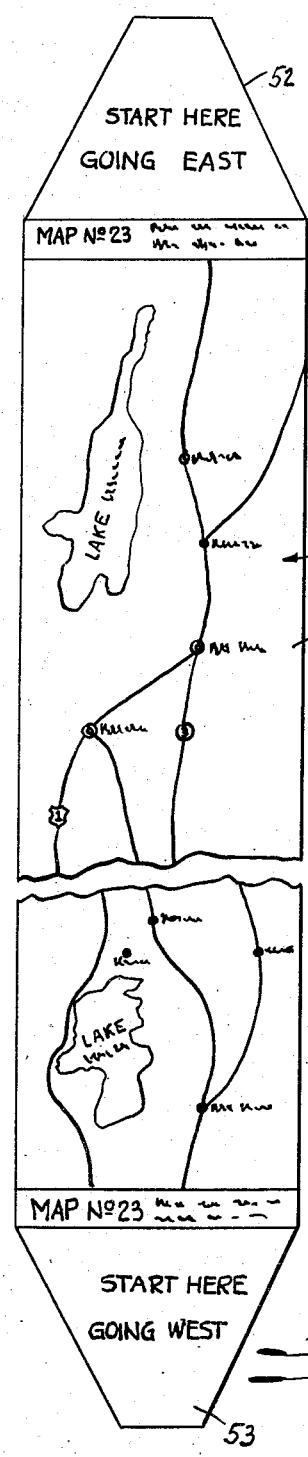
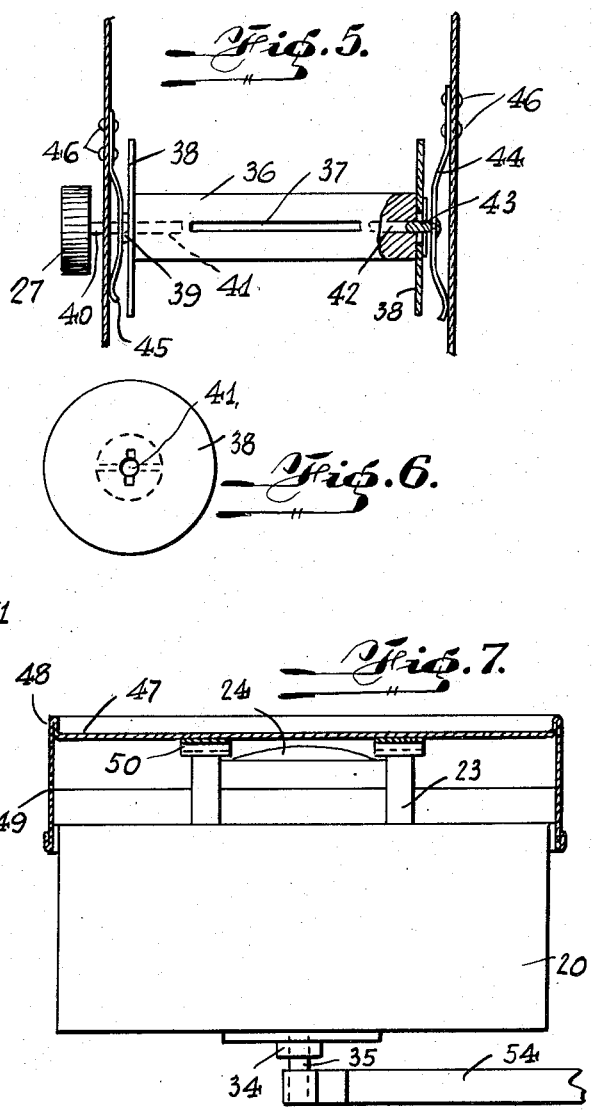
INVENTOR.
ABRAHAM SPRUNG.
BY
ATTORNEY.

Patented Nov. 3, 1953

2,657,487

UNITED STATES PATENT OFFICE 2,657,487

ROUTE MAP VIEWER

Abraham Sprung, Brooklyn, N. Y.

Application March 16, 1949, Serial No. 81,741

2 Claims. (Cl. 40—86)

This invention relates to motor vehicle accessories and more particularly to a route map viewer.

When traveling over unfamiliar territory, the operator of a conveyance, such as a motor vehicle, airplane, boat, etc., must necessarily consult his map from time to time to determine and plot his course. At such a time, the driver usually stops his car to consult his route map, to determine his present position and thereafter to decide the course to be followed in order to reach his next destination. This procedure is repeated quite frequently. It has also been found inconvenient to read such maps, since the reading matter thereon is generally quite small. Considerable time is consumed in map consultation when the trip covers a long distance.

Another inconvenience found in long motor trips is the lack of space for serving food to the driver and his passengers.

With this in mind, it is the principal object of the present invention to provide a route map viewer comprising a container for a map, which has means whereby the exact location of the vehicle can be determined at any given time with the minimum of effort, and the course to be followed can be ascertained at a glance.

It is a further feature of the present invention to provide means to render the reading matter on the map sufficiently large to make it readily readable.

Still another advantage of the present invention resides in the provision of a device of this character which may be attached to a dash board of a vehicle or any other place from which it may readily be viewed.

Still another feature of the present invention resides in the provision of an arm by which the device is secured to a vehicle, provision being made to locate the device in any position for convenient viewing by the operator or his assistant or passenger.

Another object of the present invention lies in the provision of an over-all cover in conjunction with the device, which may be readily and conveniently mounted upon the device, and which then constitutes a utility table for serving food, reading, writing etc.

These and other meritorious aims and advantages can be achieved by the novel construction, combination and arrangement of parts, hereinafter described and illustrated in the accompanying drawing, forming a material component of this disclosure, and in which:

Figure 1 is a diagrammatic view of the route map viewer in operative position.

Figure 2 is a perspective view of the route map viewer and means for attaching it to a support.

Figure 3 is a cross-sectional view of the device showing the utility table attachment in part in broken lines.

Figure 4 is a plan view of a map which may be used in association with the device, partly broken away.

Figure 5 is a lateral view of a spool upon which a map may be wound, partly broken away to show its interior construction.

Figure 6 is an end view of a spool.

Figure 7 is a sectional view of the device, having an overall cover mounted thereon, which may also be used as a table.

Referring in greater detail to the drawing, numeral 15 in Figure 1 illustrates in general an embodiment of the route map viewer of the present invention, secured by bracket support 16 to the dash board 17 of an automobile.

The device, more specifically comprises a suitable box 20 and a cover 21 mounted thereon. Cover 21, which supports magnifying glass 24, is here shown as being a separate member, but it may obviously be hingedly secured to box 20, if so desired.

Extending upwardly upon box cover 21 are a pair of spaced tracks 22 attached to cover 21 by supporting means 23. The entire cover 21 or the part thereof between tracks 22 may be made of transparent material, so that the contents of box 20, which will hereinafter be more fully described, may be viewed therethrough.

A large magnifying glass 24 may be slidably positioned between tracks 22, which may have an arrow 25 painted or otherwise affixed thereon for a purpose which will be more fully described.

Magnifying glass 24 is so arranged that it will slide in tracks 22 over cover 21 of box 20. Spring means 28 are provided for holding glass 24 in any set position to show the desired route information on an enlarged scale.

Box 20 may be divided into three sections, as is illustrated in Figure 3 by the provision of a map guide 29 and supports 33. Map guide 29 terminates at each end downwardly in member 30. Members 30 are provided each with an indentation 31 for engagement with corresponding openings 32 in each support 33 for engagement with map guide 29.

One side of box 20 is provided with a pair of spaced knobs 27 and 27a respectively, their position being on the outside of the two outer partitions as illustrated in Figures 2 and 3 of the drawings.

At the center of the bottom of box 20 there is located a flange socket 34 in which a pin 35 which is part of bracket 16, can be rigidly inserted.

The device further comprises a pair of identical spools 36 and 36a respectively, of which spool 36 is illustrated in detail in Figure 5. The description of the construction of spool 36 applies as well to spool 36a. Through its center, spool 36 is provided with a slot 37 for receiving therein one end of a map 26, the other end of map 26 being receivable in a corresponding slot 37 in spool 36a. On each end of the spools, a flange 38 is provided, terminating in a winding key 39 which is part of shaft 40 and operated by knob 27. It is adapted to engage slot 41 for rotating the spool in either direction. Each end of spool 36 is provided with a slot, as at 41 and 42 respectively. Slot 42 is adapted to receive pin 43, which is securely attached to spring 44. The latter is fixed to the rear of box 20. A similar spring, 45, is provided for the forward end of box 20. The entire device may be used in conjunction with a table 47. Table 47 terminates in a flange 48 having downreaching supports 49 and 50 which are adapted to engage tracks 22.

Figure 4 illustrates a map 26 which may be used in conjunction with the device. Map 26 has an elongated central portion 51 and two tapered ends 52 and 53 respectively, each of which may be entered into slot 37 of one of the spools.

One type of bracket which may be used to attach the device to a support is illustrated in detail in Figure 2. It comprises an arm 54, the lower end of which has a clamp 58 which has jaws for holding ball joint 55 which is connected to a similar ball joint 56 which is held in the jaws of clamp 60. The clamp is secured in a suitable manner to the front end of bracket 62, its other end being shaped for attachment to a vehicle at a predetermined position.

The device operates as follows:

When a tour in a vehicle is contemplated, the driver selects a map showing the route he wants to follow in order to reach his destination. He may trace his route upon the map. He then inserts one end of the routed map in the slot of one of the spools, and the other end of the map in the slot of the other spool. He then winds both spools in an obvious manner, until the starting point of his tour and the surrounding territory are visible between the spools. Thereupon he inserts both spools in the sections of the box provided for them. The exposed part of the map will be placed upon map guide 29 as illustrated in Figure 3. Cover 21 is then placed over box 20 and magnifying glass 24 slidably moved over the cover until arrow 25 indicates the starting point of the tour. Arrow 25 will point in the direction which is being followed. As the tour proceeds, he will turn either knob 27 or knob 27a and slowly wind the map upon the respective spool. Thus, as the knob is turned and magnifying glass 24 is adjusted, the exact position will always be indicated by the arrow on the glass, and the next localities to be reached will also appear under the glass. By means of the universal ball joint associated with arm 54, the device can be swung towards the driver, or to the person sitting next to him, who might want to assist him. As the particular route which it is desired to follow may appear upon the map angularly rather than as a straight horizontal line, the device can be rotated 360° or any fraction thereof on joint 34, so that the operator may always read the map with ease, since he can so adjust the container, that the reading matter and the route he desires to see upon the map will also be in a horizontal position. The device can be removed from its support by means of screw 63. The central compartment of box 20 may serve as storage space for additional maps, and access thereto may be had by removing map guide 29.

For further comfort in driving, the device may be converted into a utility table, which has a great many obvious uses, by placing overall cover 47 thereon, as illustrated in Figure 7.

Many modifications will present themselves. For instance, while map 26 herein referred to is a map made especially for use in connection with this device, any standard commercial route map may be used by folding it into an elongated strip; instead of using slots in the spools to hold the ends of the map, each spool may be provided with a spring clamp; other types of universal joints may be used instead of the one here mentioned; the magnifying glass may be designed larger than illustrated; an indicator other than an arrow may be provided on the glass; and the box may be provided with a light from the battery or otherwise.

Thus there has been shown and described a route map viewer in the preferred form of its embodiment, but it is to be understood that this disclosure is to be regarded merely as descriptive and illustrative and not as restrictive or limitative to the exact details shown, applicant reserving the right to make such changes in the construction as might come within the scope of the appended claims, without thereby departing from the spirit or the scope of the appended claims.

Having thus described the invention, what is claimed as new and desired to secure by Letters Patent, is:

1. In a device of the class described, a container of generally rectangular form including side and end walls and a bottom, partitions extending transversely of the container and positioned inwardly of each end to define end compartments and a center compartment, said partitions having their upper marginal edges below the upper marginal edges of the side and end walls of the container, a cover for the center compartment including a flat center plate overlying the center compartment, and downwardly and inwardly converging end walls, means for removably connecting the inwardly extending portions of the walls to the outer faces of the partitions, the downwardly turned end portions of the cover being of arcuate form to provide guide surfaces, spools arranged in the end compartments for connection with the opposite ends of a display strip, said display strip having its portion between the spools overlying the flat portion of the cover and extending downwardly toward the spools in overlying contact with said arcuate guide surfaces, and a cover for the container having a top and depending flanges, said depending flanges engaging the tops of the side and end walls of the container, the medial portion of said cover being formed with an opening, a transversely slidable viewing member movable across said cover opening, and means for guiding said viewing member in its movement.

2. The structure of claim 1 characterized in that a second cover member encloses the upper portion of the compartments and the viewing member, said second cover being provided with a flat depressed surface having an upwardly projecting marginal edge portion to define a restricted work surface.

ABRAHAM SPRUNG.

References Cited in the file of this patent

UNITED STATES PATENTS

| Number | Name | Date |
|---|---|---|
| 1,237,940 | Morrison | Aug. 21, 1917 |
| 1,395,509 | Mason | Nov. 1, 1921 |
| 1,461,842 | Westman | July 17, 1923 |
| 1,642,580 | Erb | Sept. 13, 1927 |
| 1,667,967 | Crimmins | May 1, 1928 |
| 1,833,595 | Samson et al. | Nov. 24, 1931 |
| 2,306,634 | MacDonald | Dec. 29, 1942 |
| 2,513,072 | Westenfelder | June 27, 1950 |

FOREIGN PATENTS

| Number | Country | Date |
|---|---|---|
| 462,770 | Germany | July 17, 1928 |
| 591,134 | Great Britain | Aug. 8, 1947 |